J. E. JERROLD.
Device for Securing Boiler-Tubes.
No. 167,339. Patented Aug. 31, 1875.
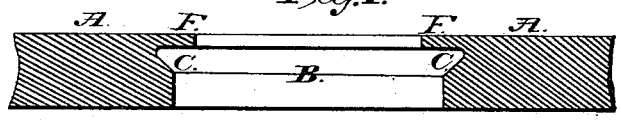
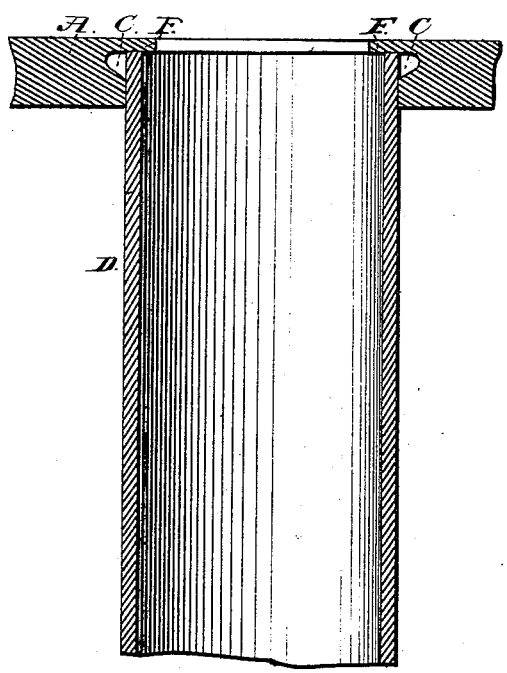
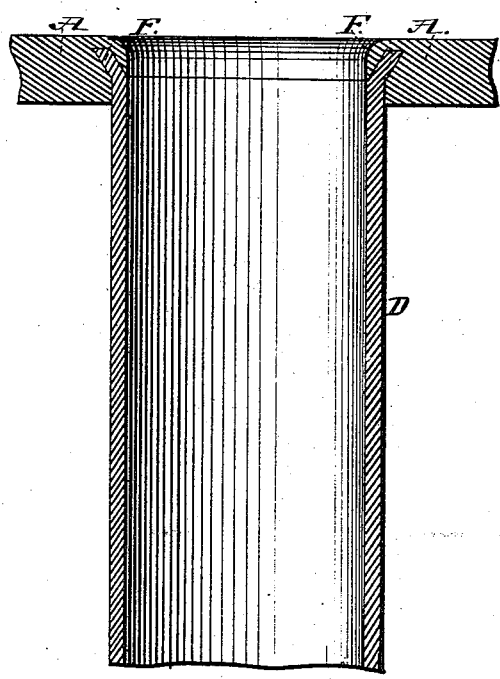
Witnesses:
A. B. Richman
W. C. Newbury
Inventor:
John E. Jerrold

UNITED STATES PATENT OFFICE.

JOHN EDWARD JERROLD, OF MEADVILLE, PENNSYLVANIA, ASSIGNOR TO HIMSELF, ORRIN LUKE, WILLIAM NEWBERRY, AND JAMES F. CALDWELL, OF SAME PLACE.

IMPROVEMENT IN DEVICES FOR SECURING BOILER-TUBES.

Specification forming part of Letters Patent No. 167,339, dated August 31, 1875; application filed March 29, 1875.

*To all whom it may concern:*

Be it known that I, JOHN EDWARD JERROLD, of the city of Meadville, in the county of Crawford and State of Pennsylvania, have invented a new and improved method of setting or securing tubes in the tube-sheets of tubular steam-boilers, of which the following is a specification:

The ordinary mode of setting or securing tubes of steam-boilers in their tube-sheets is by riveting or upsetting the ends of the tubes. Another method which has been suggested, consists in flaring the ends of the tubes outward into a circular groove, and screwing an annular nut up against the ends of the tubes thus flared. The first of these modes is objectionable on account of the liability of leakage occurring in consequence of expansion and contraction of the parts; and the second mode on account of the expense of forming the screw-thread for the nut, and the construction of the nut itself, which must be frequently renewed.

My improvement consists in protecting and securing the ends of the tubes by means of a flange formed on the outer edge of the openings in the tube-sheet, and bent inward against the ends of the tubes, which project or flare outward into the grooves formed behind the flange, as hereinafter described.

In the drawing, Figure 1 is a cross-section of a fragment of the tube-sheet, and Figs. 2 and 3 are sections of the tube-sheet and a tube, showing the mode of connection.

Holes B, Fig. 1, are bored in the usual way in the tube-sheet A, to receive the ends of the tubes D, but said holes are of the same diameter as the tubes on the inner side only of the tube-sheet, the holes being enlarged in the middle by a groove, C, and contracted on the face side of sheet A by a flange, F, as shown. When a tube, D, is inserted, in a hole, B, its end abuts the inner side of the flange F, as shown in Fig. 2, and when flared or bent outward into groove C, and the flange F turned down over it on the inside, the parts appear as in Fig. 3.

By this mode of setting tubes their ends are protected from injury by flame or heat, and leakage is not liable to occur from the expansion and contraction to which such parts are constantly subjected.

Any suitable means may be employed to flare the tube or turn down the flange.

It will be understood I do not claim a flange projecting inward, and abutting the flared end of the tube, as shown in Fig. 2.

What I claim is—

As the improvement hereinbefore described, the combination, with the tube, of the flange F turned inward or calked over the flared end thereof, as set forth, for the purpose specified.

JOHN EDWARD JERROLD.

Witnesses:
  A. B. RICHMOND,
  W. C. NEWBERRY.